March 1, 1927. 1,619,775
E. R. WHITNEY
DELIVERY TRUCK
Filed Feb. 7, 1923 6 Sheets-Sheet 3
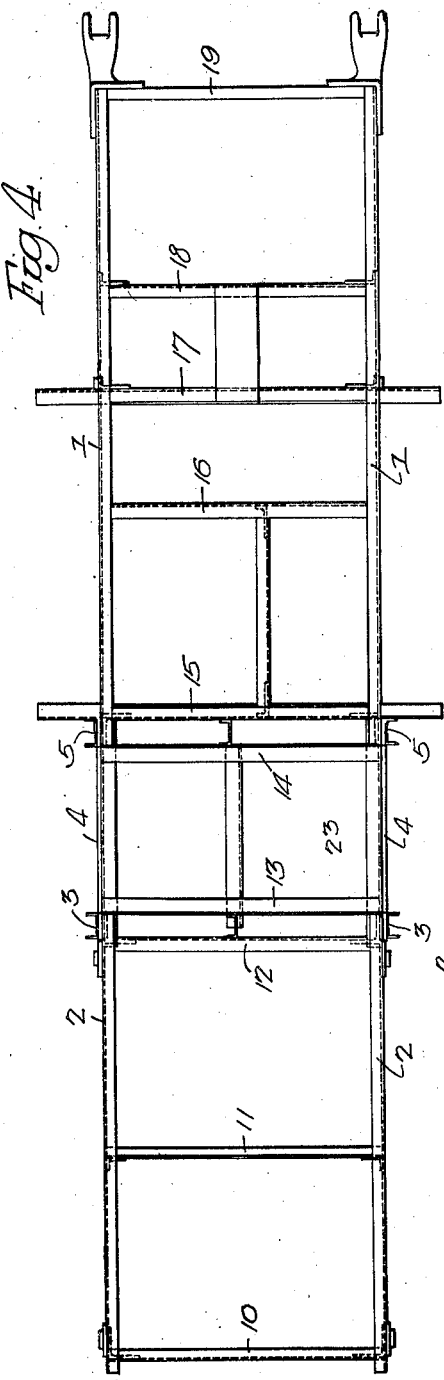
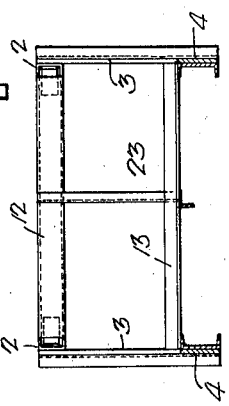
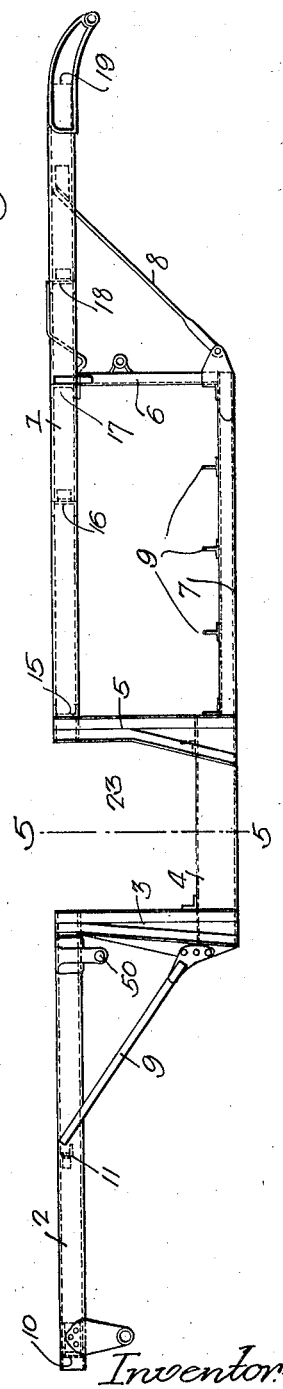
Inventor
Eddy R. Whitney
by his Attorneys
Howson & Howson

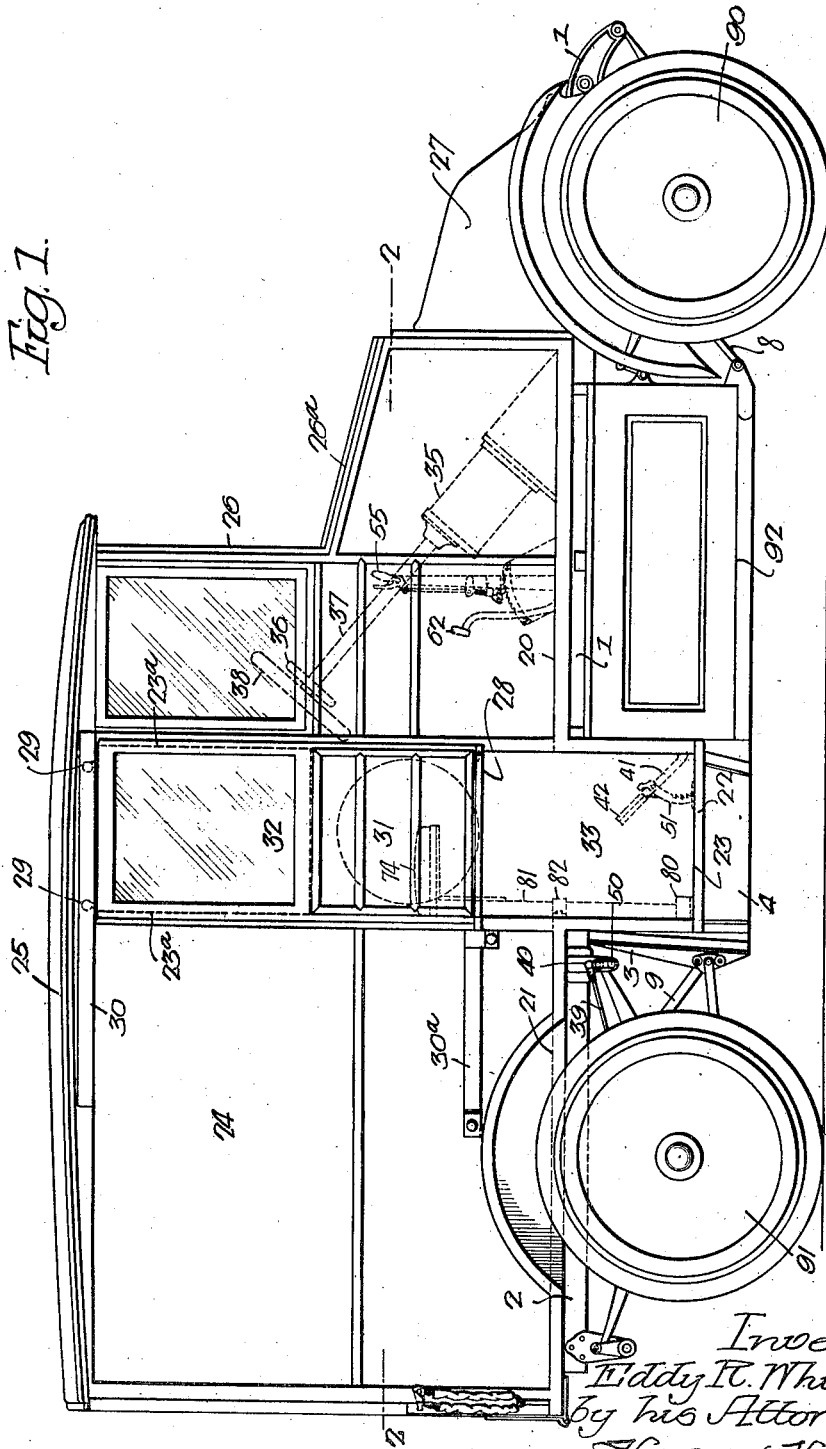

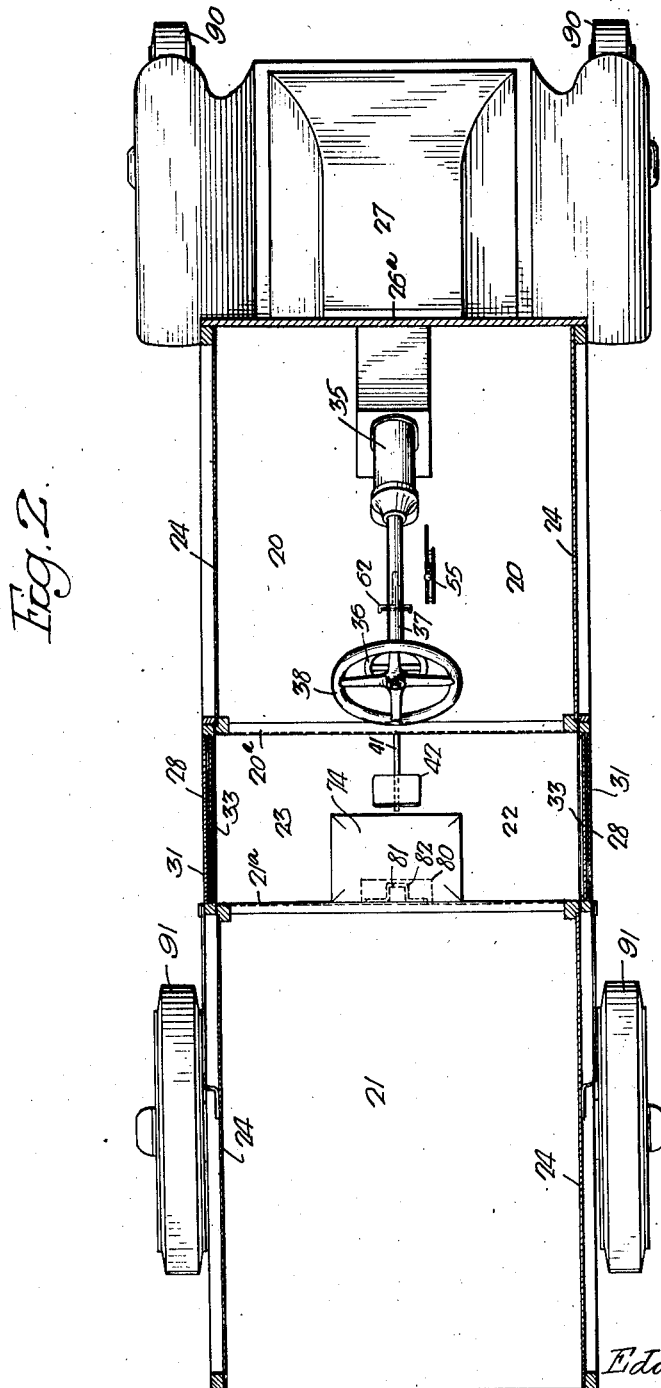

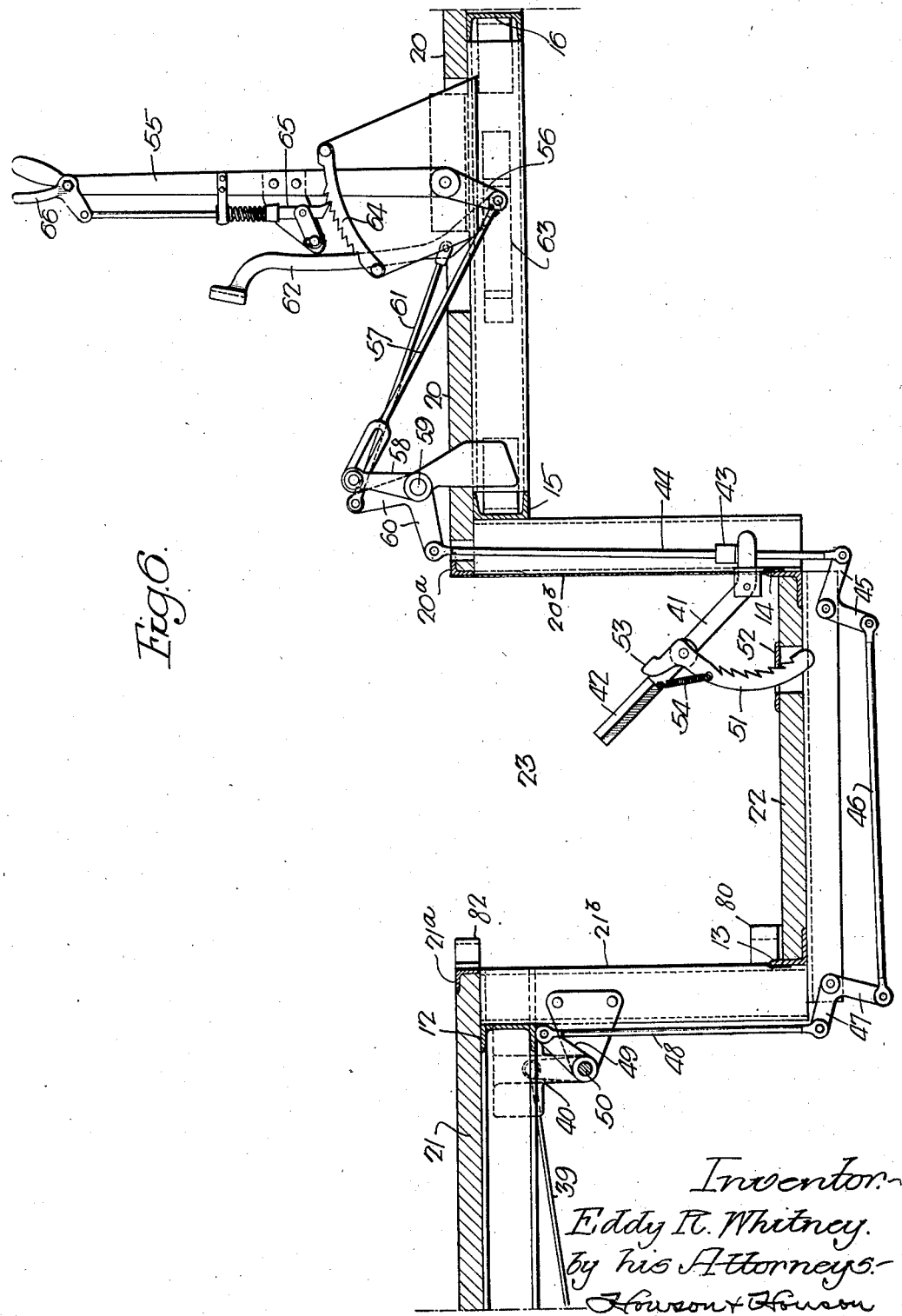

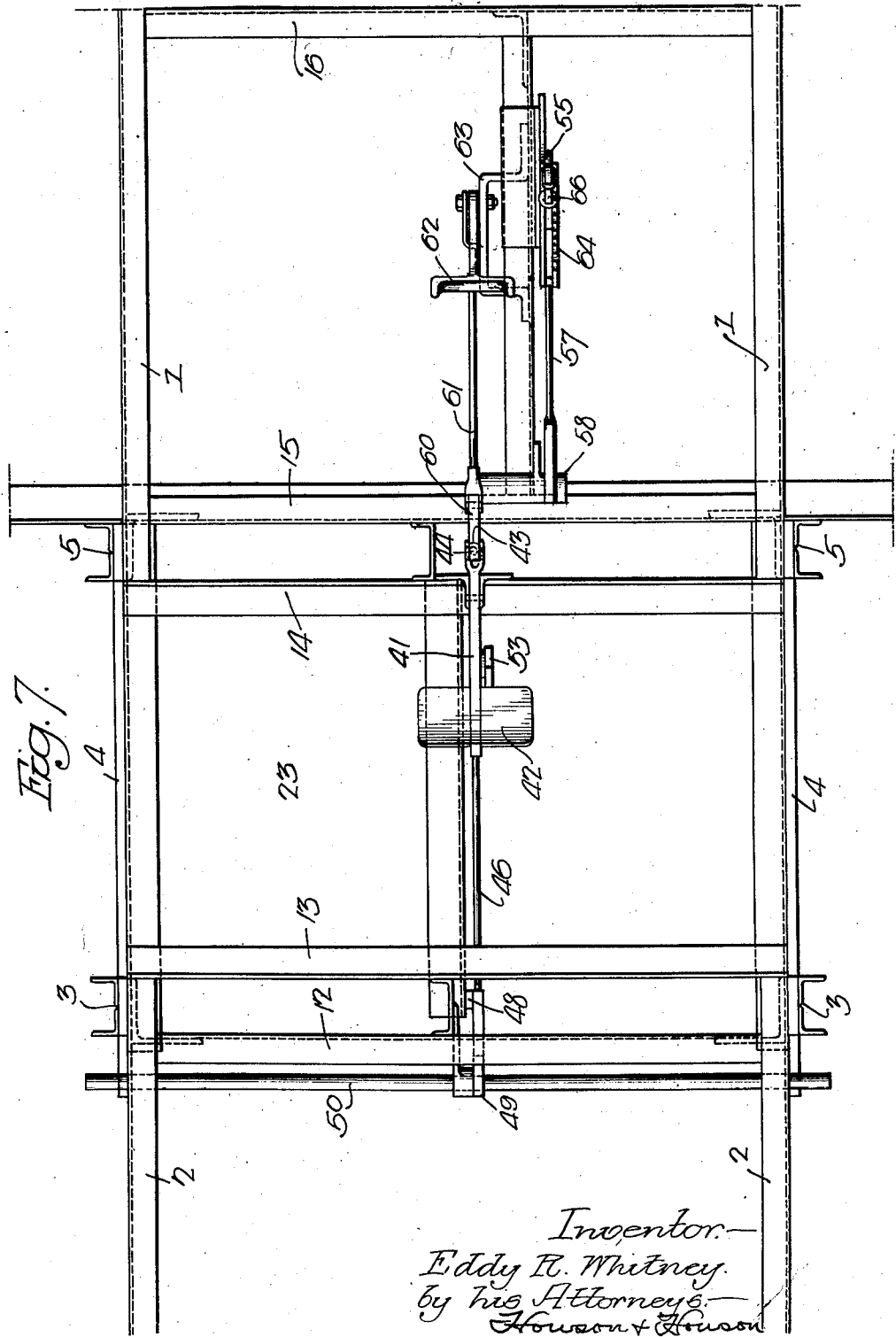

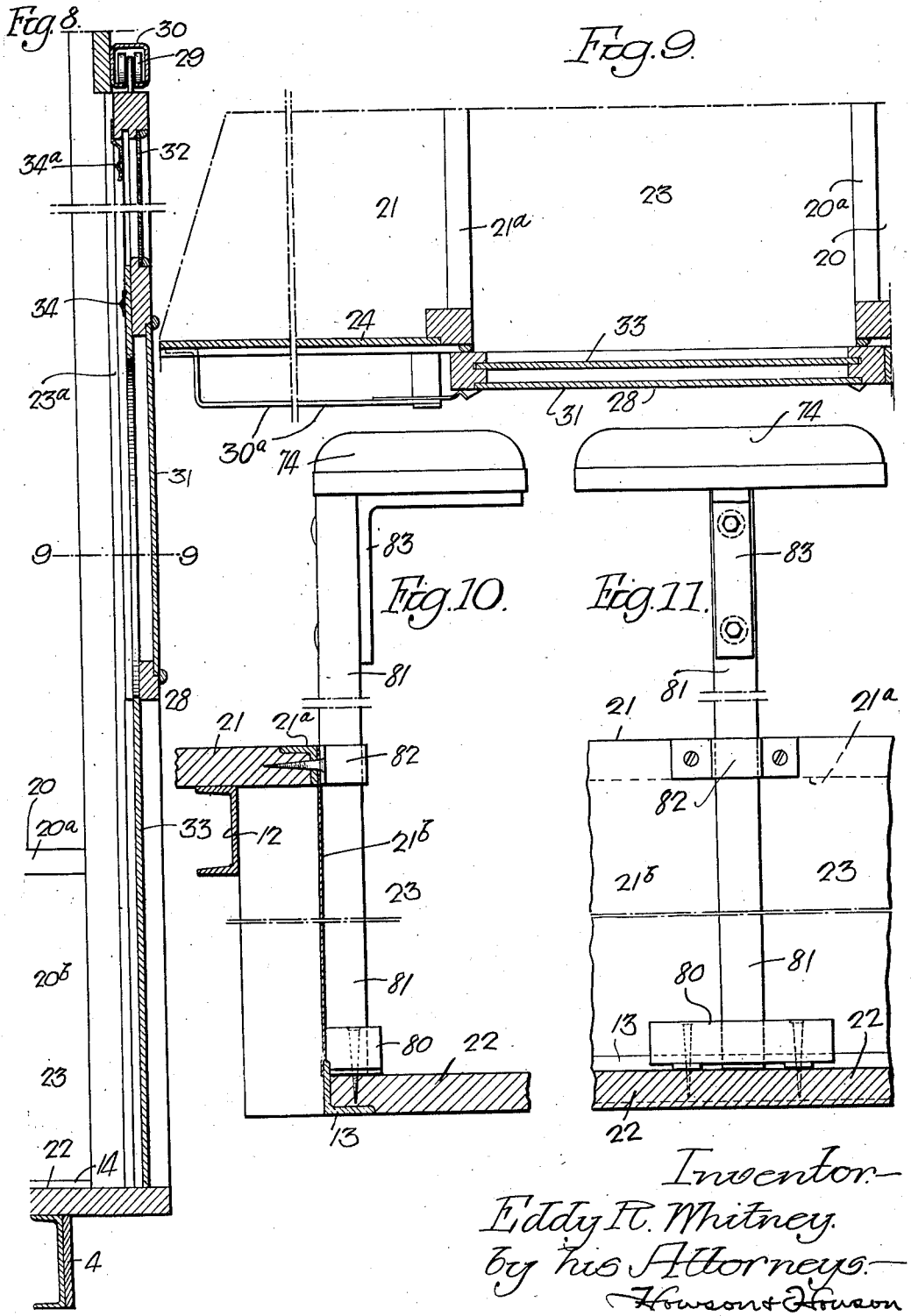

Patented Mar. 1, 1927.

1,619,775

UNITED STATES PATENT OFFICE.

EDDY R. WHITNEY, OF PHILADELPHIA, PENNSYLVANIA, ASSIGNOR TO COMMERCIAL TRUCK COMPANY, OF PHILADELPHIA, PENNSYLVANIA, A CORPORATION OF PENNSYLVANIA.

DELIVERY TRUCK.

Application filed February 7, 1923. Serial No. 617,540. REISSUED

One object of this invention is to provide a motor vehicle with a novel construction of chassis and body particularly designed for use in delivery service where stops are frequent and deliveries many and close, together as, for instance, the retail delivery of milk, said vehicle being primarily made with a view to facilitating its operation by a driver occupying any of several positions, and more especially permitting of convenient access from a number points to the boxes or packages carried.

I further desire to provide a delivery truck of the above noted type having a transverse passage intermediate the ends thereof and opening on both sides of said truck to permit of the boxes or other objects carried being stowed both in front and to the rear of it so as to be conveniently accessible from either side of the truck as well as from the rear end thereof; the invention also contemplating a novel disposition of the controlling apparatus for the truck whereby it may be operated by a driver in either a standing or in a sitting position.

Another object of my invention is to provide a delivery truck having a through passage with a novel form of driver's seat adjustable into and out of it at will and bearing a convenient relation to an electric controller and steering wheel as well as to a brake-operating means so positioned as to be actuated by a driver when the latter is occupying the seat or when he is in a standing position in the passage.

I also desire to provide a delivery truck having the above noted characteristics with a novel arrangement of brake mechanism operative by a driver from either a standing or a sitting position.

Another object of my invention is to provide a delivery truck especially designed for operation by an electric motor or motors supplied with current from a storage battery and having a body and chassis adapted to provide a through transverse passage for a driver to the rear of the battery, said passage being so positioned as to permit boxes or cases being carried both in front of it and on its rear side.

These objects and other advantageous ends I attain as hereinafter set forth, reference being had to the accompanying drawings, in which, Fig. 1 is a side elevation of a delivery truck constructed in accordance with my invention;

Fig. 2 is a horizontal section on the line 2—2 Fig. 1;

Figs. 3 and 4 are respectively a side elevation and a plan of the frame of my delivery truck;

Fig. 5 is a transverse section on the line 5—5, Fig. 3;

Fig. 6 is an enlarged vertical section taken longitudinally of the truck and illustrating my preferred arrangement of brake-controlling mechanism and the parts of the frame associated therewith;

Fig. 7 is a plan of the frame and braking mechanism shown in Fig. 6;

Fig. 8 is an enlarged vertical section showing the preferred construction of one of the side doors of my delivery truck;

Fig. 9 is a horizontal section on the line 9—9, Fig. 8; and,

Figs. 10 and 11 are side and front elevations partly in section, illustrating a form of driver's seat constituting part of my invention.

In the above drawings, 1—2 represent parallel, longitudinally extending beams or girders, each constituting one of the side members of the chassis of my vehicle, consisting of a front section 1, a rear section 2, and a downwardly extending, substantially U-shaped frame 3—4—5 having the tops of its side members 3 and 5 respectively connected to said sections 2 and 1. Each of the sections 1, at a point intermediate its front end and the frame member 5, has connected to it a downwardly extending member 6 of the same length as said member 5 and the bottom ends of these two members are connected by a horizontal member 7 parallel with the section 1.

An inclined brace 8 is extended upwardly and forwardly from the point of junction of the members 6 and 7 to the frame member 1 and a second brace 9 is extended upwardly and rearwardly from the point of junction of the frame members 3 and 4 and the frame member 2. The two trusses formed by the above frame elements 1—9 are substantially parallel and are braced and tied together by transverse members 10—19. The frame formed by these members and said trusses is supported in any desired and suitable manner on two pairs of wheels indicated at 90 and 91.

The spaces defined by the two sets of frame members 5—7—6—1 are substantially rectangular in outline and together with cross floor beams 92, form a casing for the reception of a storage battery, while the space 23 defined by the two sets of frame members 3—4—5 constitutes a through passageway immediately to the rear of the battery casing and of substantially the same depth.

On the chassis above described is mounted a suitable closed body having a floor portion 20 in front of the passageway 23 and a second or main floor portion 21 to the rear of said passage. The latter itself preferably has a floor 22, a front wall 20$^b$ and a rear wall 21$^b$, the body being otherwise made up of sides 24—24, a top 25, a front 26 and an extension 26$^a$ from the front generally similar in position and form to the cowl of an engine driven motor vehicle. At the front of this extension is a hood 27.

The front 26 is preferably made in the form of a rectangular frame structure having a glass window therein (not shown) and each of the sides 24 has in it an elongated vertical opening 23$^a$ extending from the top 25 down to the level of the floor 22 of the passage 23, which opening is provided with a door structure 28 slidable in a vertical plane, for which purpose it is provided with a pair of wheels or rollers 29 attached to its top edge and slidable in a suitable guideway 30 from a position in which it closes the passage 23 to a position to the rear of said passage and parallel with the adjacent portions of the side 24, the lower edge of said door structure being guided by a rail 30$^a$ as shown in the drawings.

To make possible this sliding action of the door, it is preferably made to include an upper section 31, which has in its top half a window 32, and a bottom section 33. This latter is vertically slidable so that when dropped it may close the lower portion of the passage 23 and when raised may be held flush with or clear of the bottom edge of the section 31 permitting the latter to be moved to the rear to completely open the through passage 23. For the purpose of holding the section 33 in its raised position its upper part has a projection 34 designed to cooperate with a spring catch 34$^a$ on the upper part of the member 31.

For propelling my truck I provide suitable electric motors (not shown) designed in the present instance to drive the rear wheels 91 and supplied with electric current from a storage battery in the casing or box 93. The operation of the vehicle is governed by an electric controller 35 mounted under the cowl portion 26$^a$ of the body and supported so as to be rearwardly inclined at an angle of about 45° to the horizontal. This controller is operated by a hand wheel 36 fixed to a tubular stem 37, through which also extends a steering post actuated from a steering wheel 38 parallel with and immediately adjacent the controller wheel 36. This steering post is connected to govern the position of the front wheels 90 in the manner well understood in this art and the steering and controlling wheels are so positioned as to be conveniently accessible for and readily operative by a driver standing in the passageway 23.

The braking mechanism for the truck includes a rod or link 39 extending rearwardly from a lever arm 40 to any suitable brake bands or other devices operative on drums applied to the rear wheels 91. In order to permit of the convenient operation of these brakes (not shown) by a driver standing in the passageway 23, I fulcrum in the latter an elongated pedal lever 41 having a foot plate 42 and operative on a collar 43 fixed to a rod or link 44 whose lower end is connected through a bell crank lever 45, a link 46, a second bell crank lever 47, and a link 48, with a lever arm 49 fixed to a transversely extending shaft 50. This last shaft is carried in bearings below the frame members 2, immediately to the rear of the members 3 and to it are also fixed arms 40 which operate the brakes through the links or chains 39.

It is to be noted that that end of the lever 41 which engages the collar 43 is so formed as to permit independent longitudinal movement of the link 44 and said lever has pivoted to it a toothed segment 51 movable through an opening in a plate 52, mounted in the floor 22, the parts being so arranged that said segment will cooperate with the edge of said opening to hold the foot-engaged end of the lever 41 in any depressed position with the brake mechanism applied. This segment is formed with an arm 53 projecting adjacent the foot plate 42 so that it may be applied by the foot of the driver and a spring 54 is connected between the segment and the lever 41 so as to tend to disengage said teeth from the floor plate.

In order to permit the braking mechanism of the truck being operated by hand, I also provide a hand lever 55 fulcrumed to a suitable supporting structure mounted on the front floor section 20 and projecting upwardly immediately to the rear of the controller 35 at one side thereof. This hand lever has fixed to it an arm 56 connected through a link 57 with an arm 58 fixed to a short shaft 59. To this shaft is also fixed a bell crank lever 60 having one of its arms connected to the upper end of the link 44. The second arm is connected through a link 61 with a second foot lever 62 fulcrumed to a bracket 63 immediately adjacent the hand lever 55. The latter has associated with it a toothed segment 64 cooperating with a spring-actuated dog 65 controlled by a handle 66 on the upper end of the hand lever 55 and the arrangement is such that the brakes may be set or released at will by operating any one of the three elements comprised by the foot levers 41 and 62 or the hand lever 55. The latter is so positioned as to be conveniently grasped and operated by an operator standing in the passageway 23, while the foot lever 62 is in such a position that it may be conveniently operated by a driver when the latter is seated upon a chair or seat mounted in the space immediately above the passageway 23.

While it will be understood that this seat may have any desired or suitable construction, I preferably provide adjacent the rear side of the floor 22 a socket 80 designed to receive the lower end of a vertically extending bar or stem 81. The latter lies against the rear wall 21$^b$ of the space 23 and has its upper end laterally braced and properly positioned by a retaining strap or guide 82. On the upper end of the bar 81 is mounted the seat proper indicated at 74 and this is suitably carried by an angle brace 83 so as to project forwardly over the space 23 at the height necessary to support the driver of the truck in a sitting position. When desired, the seat may be removed by drawing it upwardly so that the bar 81 slides out of the retaining strap 82, thus leaving the space or passageway 23 clear as may be required for certain purposes.

When the seat has been positioned as shown in the drawings it may be conveniently used by a driver in operating the truck for relatively long or non-stop runs. When however, the driver desires to make a number of stops at short intervals and is compelled to repeatedly enter and leave the truck, as is necessary in delivering milk, for example, the seat may be removed out of the way of the driver who may stand in or pass through the passageway.

From the above description it will be appreciated that a truck constructed as above described is particularly adapted for the transportation and delivery of milk in bottles. The latter are customarily placed in boxes containing a dozen and it is customary for a delivery truck to carry not only bottles containing different grades of milk, but also bottles of cream, buttermilk, etc. By providing the passageway 23 between the two floor portions 20 and 21 of the body, it is possible to place the bottle-containing boxes in front of as well as behind this passageway and to arrange them in a number of layers or tiers which may be stepped relatively to each other. The driver thus has free access to the different grades of milk or cream, etc., without being required to frequently shift the positions of the boxes and he may also have access to the latter from the rear of the body.

By the arrangement shown, relatively large storage spaces are provided for the milk boxes and it is obvious that the driver may easily and quickly have access to the bottles therein because of the convenient position of the passageway 23 which allows entry of the truck from either side thereof. It will further be noted that the bottom of the passageway is but a short distance above the ground level, so that it is an easy matter to enter and leave the truck and operate the latter with a minimum of delay in making the frequent stops and short distance runs necessary in delivering milk for domestic purposes.

I claim:

1. The combination in a motor vehicle of a main frame made in two sections, and a depression between the two sections of the frame forming a transverse passage; means for suspending the floor of said passage from the said main frame; and a battery carrier, the floor of which is attached at its inner end to the suspended floor structure of the passage, while the forward end is suspended from the main frame.

2. The combination in a motor vehicle of a frame having downwardly extending portions defining a transverse passage; a body on the frame having sides openings at the ends of the passage; load-carrying floor sections both at the front and rear of the passage, with brake mechanism extending under the transverse passage; and two sets of brake-actuating mechanisms, one located in the passage, and the other located on the floor in front of the passage.

3. The combination in a motor vehicle of a main frame made in two sections separated by a transverse passage; a floor for said passage suspended from the main frame; brake mechanism consisting of links and levers extending from the main frame and under the floor of the passage; an actuating lever for the brake mechanism on the front floor of the main frame; and a second actuating lever for the brake mechanism located within the transverse passage.

EDDY R. WHITNEY.